Jan. 15, 1924.　　　　　　　　　　　　　　　　1,480,861
A. E. NEWMAN
SCREEN SHIELD
Filed July 16, 1919
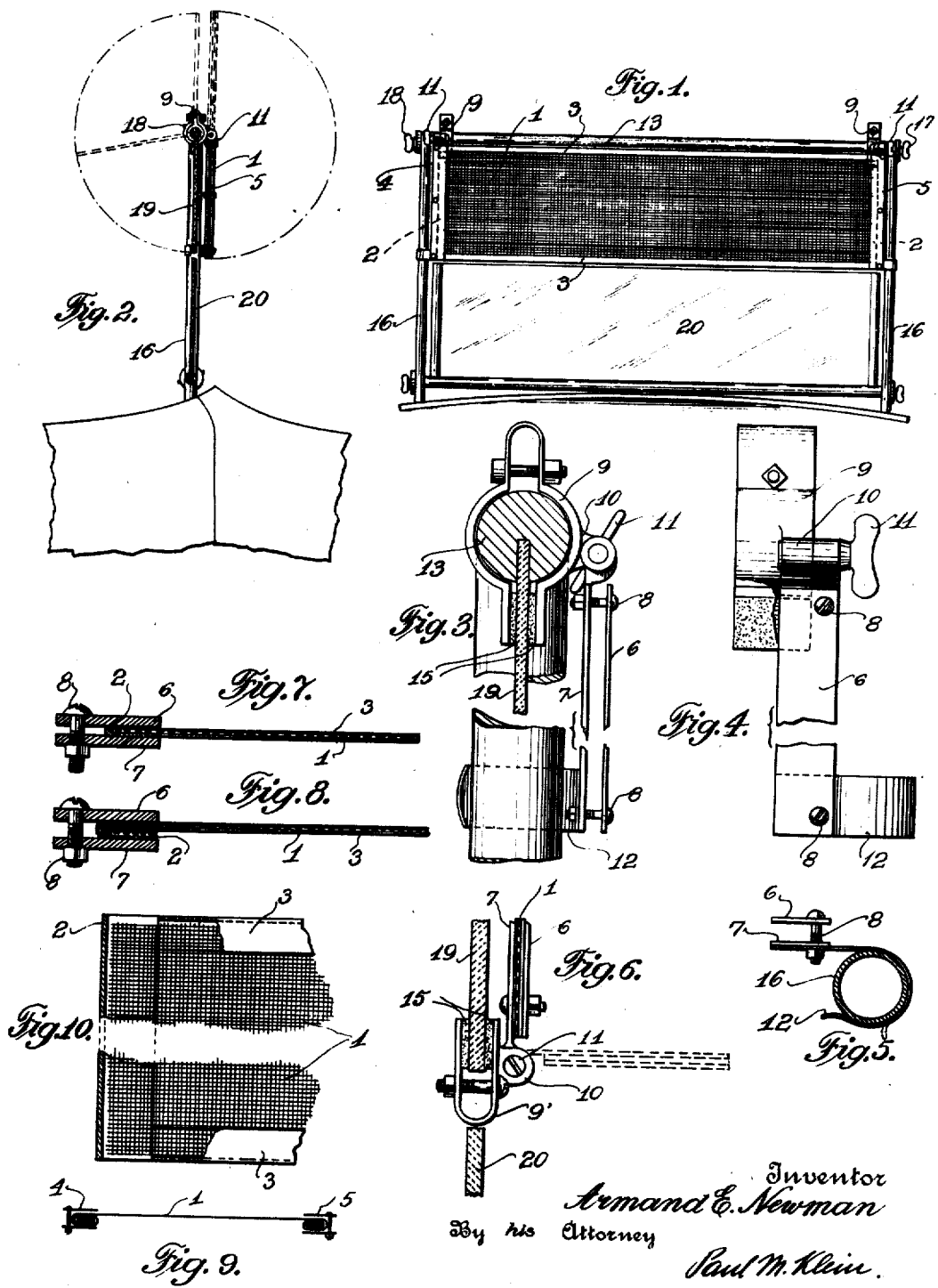
Inventor
Armand E. Newman
By his Attorney
Paul M. Klein Patented Jan. 15, 1924.

UNITED STATES PATENT OFFICE.

ARMAND E. NEWMAN, OF NEW YORK, N. Y.

SCREEN SHIELD.

Application filed July 16, 1919. Serial No. 311,236.

*To all whom it may concern:*

Be it known that I, ARMAND E. NEWMAN, a citizen of the United States, and resident of New York city, in the county of New York and State of New York, have invented certain new and useful Improvements in Screen Shields, of which the following is a specification.

This invention relates to screen shields and particularly to such shields used in connection with driving automobiles at night. Its object is to provide a device which is easily attachable to and detachable from either the frame or the upper or lower half of the glass shield in front of a car, in such a way as to permit it to take the place of the glass windshield if so desired.

Another object is to provide an arrangement whereby the length of the substitute windshield may be regulated to suit any required measure.

A further object is to provide means whereby the driver is protected against insects and dust when driving on hot summer nights, while enjoying the breeze, otherwise shut out by the glass, or, from being annoyed by the glare from approaching machines, the screen causing a refraction of rays.

These and other objects will be more fully apparent from the following description and drawings, forming a part of this specification, in which—

Figure 1 is an elevation of the screen shield, looking from the driver's seat.

Figure 2 is a side view of same, partially in section, showing a few ways of usage in combination with the glass shield.

Figure 3 is a detail view of one side clamp.

Figure 4 is a front view of same.

Figure 5 is a partial bottom view of same.

Figure 6 shows a modified form of a side clamp.

Figure 7 is a detail view in section of the screen clamped in its original form.

Figure 8 is a detail view in section of the screen folded once and clamped.

Figure 9 is a diagrammatical top view of a shortened screen.

Figure 10 is an elevation showing a portion of the screen, partially in section, illustrating a preferred form.

Referring to figures, screen 1 is set into a frame composed of stiff side members 2, and pliable but rigid top and bottom members 3, which hold the screen 1 stretched. The screen is preferably of sufficient length to allow its use for the widest windshield. If a shorter length is required the screen is to be folded, as shown in Figures 8 and 9, whereby the stiff members 2 form a core around which the pliable members 3, and with them the screen 1 are folded or rolled. Thus the screen may be fitted to any windshield by simply folding it to the desired length.

The folded ends or the stiff side members 2 are then inserted into the expansible clamps 4 and 5 consisting of one loose member 6 and a hinged member 7 connected with each other by bolts 8 or in any other suitable way to allow the two members 6 and 7 to rigidly hold the screen ends. At its upper portion the member 7 is hinged to the clip 9 by way of a lug 10. Locking means 11 are provided to enable the clamps to be held in any desired position, while clips 12 on the lower part of member 7 serve to hold the screen in any predetermined or the usual position when the screen is used.

The clips 9 may be exchanged or altered to any desired shape in order to meet different constructions of the windshield.

In Figures 1, 2, 3 and 4 a clip is shown attached to both upper glass frame 13 and to glass 19, and to the latter by way of pads 15, touching the glass. The glass frame 13 swings in the frame 16 and may be held in any desired position by wing nuts 17 and 18. With the frame 16 swings out the clamp 9, but the screen 1 being pivotedly attached thereto, remains in place, or may be swung and held in any desired position (see Figure 2). It is necessary, when using the screen instead of the glass as a shield, to frequently brush off the netting on the outer side while riding. This is facilitated by the hinged arrangement at the upper part of member 7 and the clip 12. The screen is swung in, brushed off, and swung back again, and held in place by clip 12 engaging frame 16.

In cases where it is impossible to attach clips 9 on top of the glass shield frame, another clip, shown in Figure 6 is used whereby the screen can be fastened to the glass itself either from the bottom or the side of the upper glass portion 19 or to the top or sides of the lower glass portion 20. The operation of the screen thus attached is similar to that fastened to the upper glass frame.

While the drawings and the description treat with a specific form of my device, it is self evident that alterations and improvements may be made without departing from the broad scope of my invention.

I claim:—

1. A screen shield comprising a netting, two stiff side frames, two pliable frames connecting the two side frames, said netting being rigidly set into all four frames, thus forming a solid panel, expansible side clamps for gripping the stiff side frames, a hinge at one end of said clamps, locking means for setting said clamps to any desired position, means for rigidly attaching said clamps to a desired object at one end, and clips at the other end for holding the clamps in vertical position.

2. The combination with expansible side clamps hinged at their upper end to a permanent fastening clip, and having a setting device for holding said clamps in any desired position, and clips, at their lower end, for holding them in a certain predetermined position when desired, of a screen shield comprising two stiff and two pliable frame members, a screen set into said frame members, said stiff members forming a core for said pliable members when the screen shield is to be folded, the folded ends of which are held by said expansible side clamps.

Signed at New York city, in the county of New York and State of New York, this 8th day of July, A. D. 1919.

ARMAND E. NEWMAN.